United States Patent
Radhakrishnan et al.

(10) Patent No.: US 11,360,806 B2
(45) Date of Patent: Jun. 14, 2022

(54) APPLICATION ATTACHMENT BASED ON USER APPLICATION PREFERENCES

(71) Applicant: VMWARE, INC., Palo Alto, CA (US)

(72) Inventors: Smitha Radhakrishnan, Bengaluru (IN); Sivaprasad Kundoor Govindankutty, Bengaluru (IN); Jubish Kulathumkal Jose, Bengaluru (IN); Noble Peter Aranjani, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 301 days.

(21) Appl. No.: 15/671,172

(22) Filed: Aug. 8, 2017

(65) Prior Publication Data
US 2018/0365051 A1    Dec. 20, 2018

(30) Foreign Application Priority Data
Jun. 19, 2017    (IN) .............................. 201741021409

(51) Int. Cl.
*G06F 15/177*    (2006.01)
*G06F 9/48*    (2006.01)
*G06F 9/50*    (2006.01)
*G06F 9/455*    (2018.01)

(52) U.S. Cl.
CPC ........ *G06F 9/4856* (2013.01); *G06F 9/45558* (2013.01); *G06F 9/5077* (2013.01); *G06F 2009/45579* (2013.01); *G06F 2009/45595* (2013.01)

(58) Field of Classification Search
CPC .. H06F 9/4856; G06F 9/45558; G06F 9/4856; G06F 9/5077; G06F 2009/45595
See application file for complete search history.

(56) References Cited

U.S. PATENT DOCUMENTS

| | | | |
|---|---|---|---|
| 9,369,504 B1 * | 6/2016 | Pavlov | .................. H04L 65/40 |
| 2011/0035358 A1 * | 2/2011 | Naik | .................. G06F 9/45558 |
| | | | 707/640 |
| 2012/0089666 A1 * | 4/2012 | Goswami | ............ G06Q 10/103 |
| | | | 709/203 |
| 2014/0282623 A1 * | 9/2014 | Conover | ............ G06F 9/44505 |
| | | | 719/318 |

\* cited by examiner

*Primary Examiner* — Hua Fan

(57) ABSTRACT

Described herein are systems, methods, and software to enhance user application preferences in a virtual computing environment. In one implementation, an application attach service is configured to identify a request to attach one or more applications to a virtual machine for an end user. In response to the request, the application attach service identifies the one or more required applications based on file type selections provided by the end user during previous virtual computing sessions, and initiates an attach process for the one or more applications to the virtual machine.

20 Claims, 10 Drawing Sheets

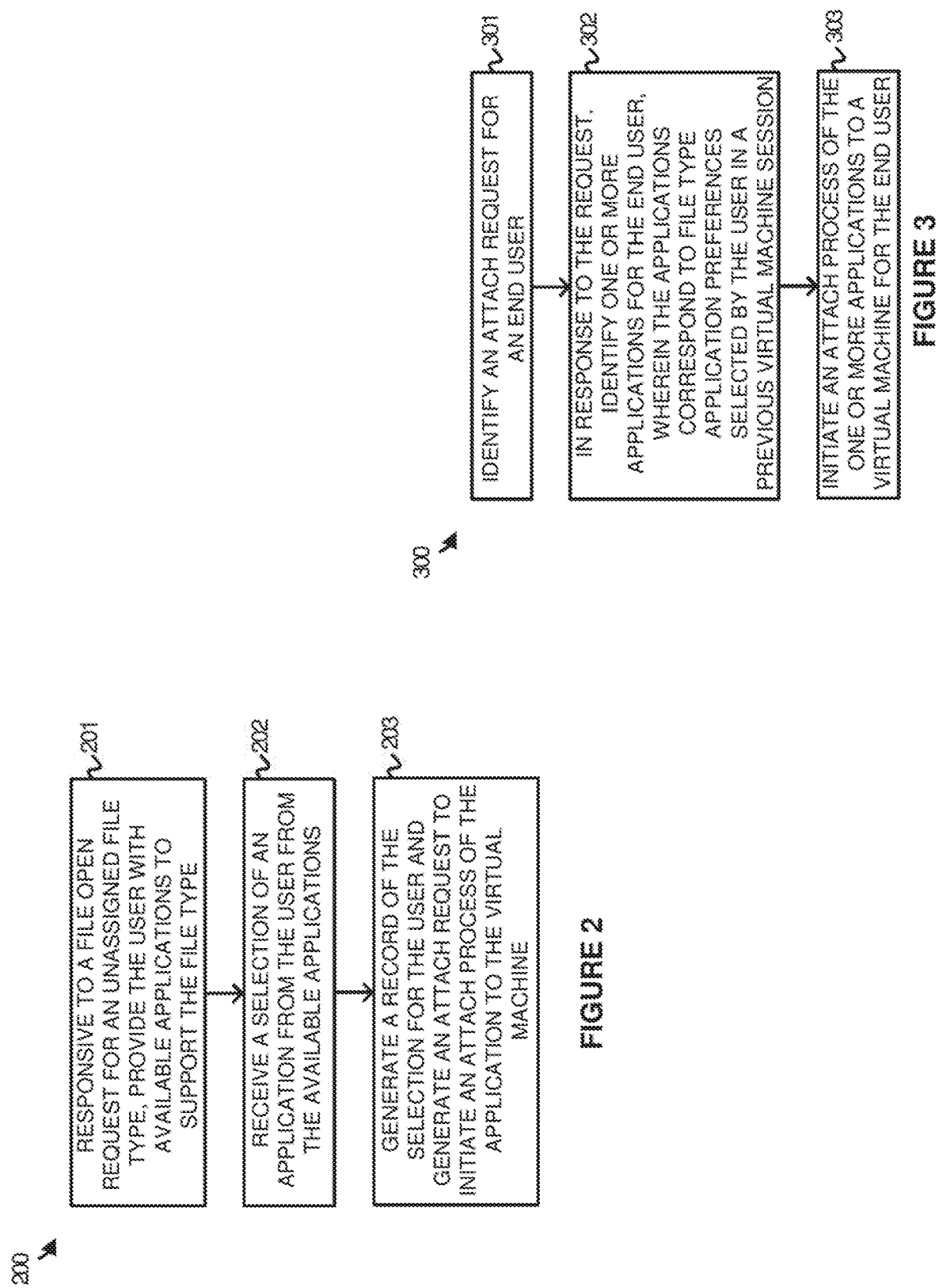

| FILE TYPE 612 | FIRST APPLICATION OPTION 614 | FIRST APPLICATION OPTION 615 | FIRST APPLICATION OPTION 616 |
|---|---|---|---|
| MEDIA FILE | APPLICATION 620 | APPLICATION 621 | APPLICATION 622 |
| WEB BROWSING | APPLICATION 623 | APPLICATION 624 | APPLICATION 625 |
| CODE EDITOR | APPLICATION 626 | APPLICATION 627 | APPLICATION 628 |
| COMPRESSED FILE EXTRAPPLICATION | APPLICATION 629 | APPLICATION 630 | APPLICATION 631 |

DATA STRUCTURE 600

FIGURE 6

| FILE TYPE 612 | USER 710 | USER 711 | USER 712 |
|---|---|---|---|
| MEDIA FILE | APPLICATION 620 | APPLICATION 620 | APPLICATION 622 |
| WEB BROWSING | APPLICATION 623 | APPLICATION 624 | APPLICATION 624 |
| CODE EDITOR | | | APPLICATION 628 |
| COMPRESSED FILE EXTRAPPLICATION | | APPLICATION 630 | APPLICATION 631 |

DATA STRUCTURE 700

FIGURE 7

APPLICATION ATTACHMENT BASED ON USER APPLICATION PREFERENCES

RELATED APPLICATIONS

Benefit is claimed under 35 U.S.C. 119(a)-(d) to Foreign Application Serial No. 201741021409 filed in India entitled "APPLICATION ATTACHMENT BASED ON USER APPLICATION PREFERENCES", on Jun. 19, 2017 by VMware, Inc., which is herein incorporated in its entirety by reference for all purposes.

BACKGROUND

In virtual desktop environments, host computers may execute a plurality of virtual machines that can be accessed as a service by end users for traditional desktop computing tasks. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications. For example, an engineer of an organization may require a different set of applications than a financial officer of the same organization. To provide the required applications, the service may identify applications required for a user, and mount or attach application volumes to the virtual machine allocated to the user to make the applications executable from the storage volumes. An application volume may be considered a containerized, virtualized, application stored in a virtual disk. When the virtual disk is attached to the virtual machine, an agent running on the virtual machine overlays the containerized application on the native file structure so that the containerized application appears to be natively installed onto the disk of the virtual machine. In some implementations, this attachment process may modify any required registry information of the virtual machine to make the applications executable from the application volumes.

Once the application volumes are attached, the user may execute the applications located in the attached volumes as if the applications were locally installed on the virtual machine. However, although applications may be attached via application volumes, the operations, to attach and detach applications for the end users can consume unnecessary resources within the computing environment. In particular, unnecessary resources may be used to attach applications that are not preferable and/or required by a user of the virtual computing service.

OVERVIEW

The technology disclosed herein enhances the allocation of applications to virtual machines in a computing environment. In one implementation, a method of operating an application attach service to attach applications to virtual, machines in a computing environment includes identifying an attach request to attach one or more applications associated with an end user to a virtual machine. The method further provides, in response to the attach request, identifying the one or more applications for the end user, wherein the one or more applications correspond to file type application preferences selected by the user in at least one previous virtual computing session in the computing environment, and initiating an attachment process of the one or more applications to the virtual machine.

In at least one implementation, the attachment process may include attaching at least one application storage volume that stores the one or more applications to the virtual machine, and overlaying contents of the at least one application storage volume in a file structure of the virtual machine to make the one or more applications readable and executable from the at least one application storage volume.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates an operation of a virtual machine to identify file type application preferences of an end user according to an implementation.

FIG. 3 illustrates an operation of an application attach service to attach applications to a virtual machine according to an implementation.

FIG. 6 illustrates a data structure for attachable applications and corresponding file types according to an implementation.

FIG. 7 illustrates a data structure for associating end users with file type applications according to an implementation.

DETAILED DESCRIPTION

Figure 1:
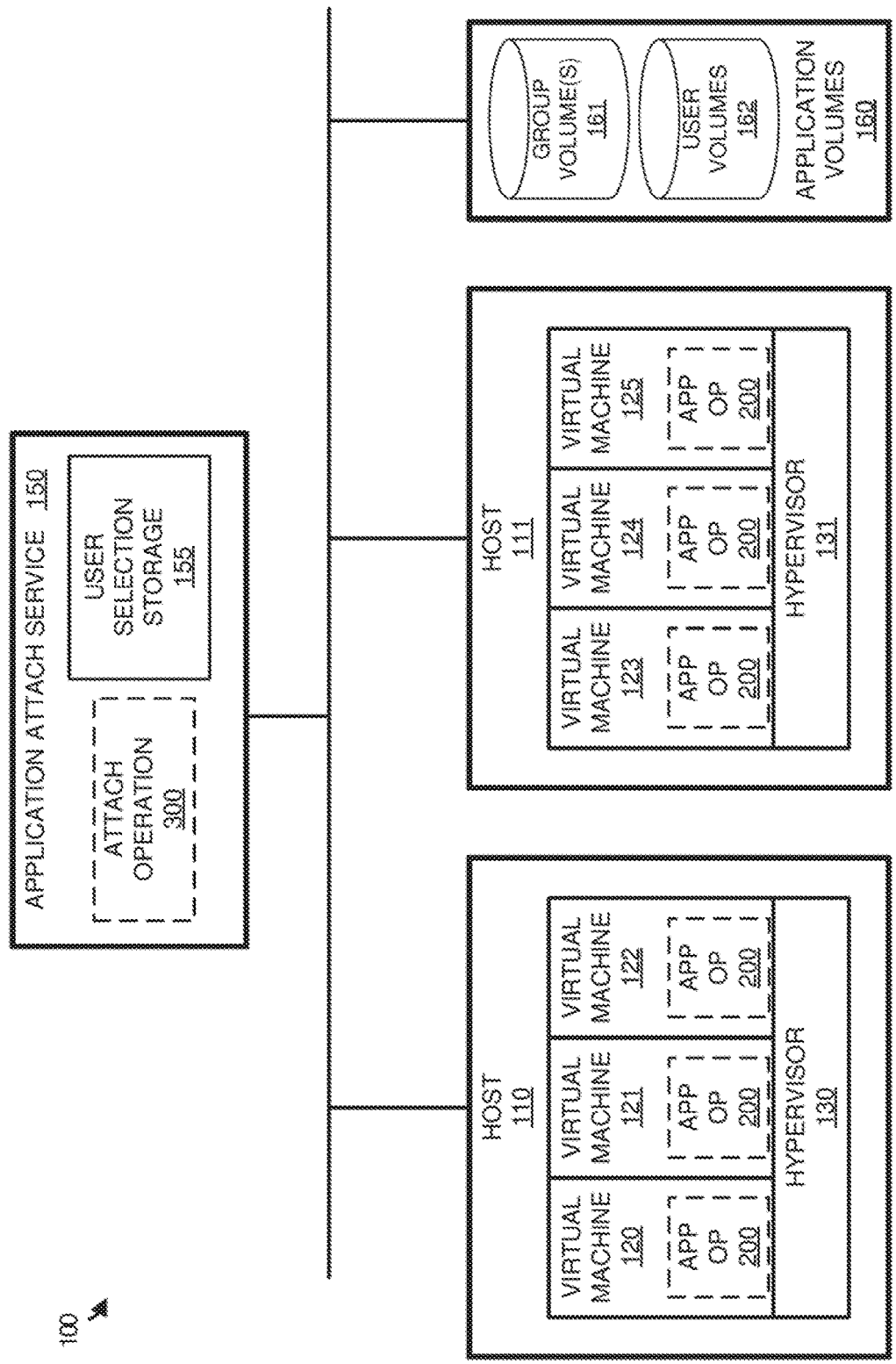
FIG. 1 illustrates a computing environment to attach application storage volumes to virtual machines according to an implementation.

The various examples disclosed herein provide enhancements for application management for a virtual computing environment. In many situations, virtual machines provide a centralized computing platform for one or more end users to access and execute desired applications and operations. To provide each of the end users with the required applications, and prevent access to unnecessary applications, one or more application volumes are made available in the virtual environment that are capable of being attached to the individual virtual machines. These application volumes may include, but are not limited to, virtual machine disks (VMDKs), virtual hard disks (VHDs), or some other virtual disk file capable of storing applications for execution on the virtual machines.

To make the applications available to each individual user, an application attach service may be employed that acts as a volume manager that initiates the attachment of application volumes to the individual virtual machines. For example, a user may, via an end user device, initiate a service login to initiate a virtual computing session. This service login may be accomplished using a dedicated application on the end user device, a web browser interface on the end user device, or any other similar interface on the end user device. Responsive to the service login, the virtual computing service may identify an available virtual machine to allocate to the end user, and initiate a user login process to log the end user into the virtual machine. Additionally, the service may identify one or more storage volumes associated with the user and attach the one or more storage volumes to virtual machine. Once attached and the user is logged into the virtual machine, the user may execute any of the applications from the attached storage volumes. Although this is one example of when storage volumes may be attached to a virtual machine, it should be understood that volumes may be attached by other mechanisms. For example, an agent executing inside the virtual machine may request the application service to attach one or more applications via attachable storage volumes.

To attach the storage volumes to the virtual machine, the virtual computing service may initiate a process to mount or map the volumes to the allocated virtual machine for the end user, and overlay the contents of the volumes to make the one or more applications within the volumes executable by the virtual machine. In some examples, mounting a volume to the virtual machine may include providing an access path and mount point for the volume to the virtual machine, which may comprise an interact protocol (IP) address, a directory name, a file name, or any other path information to access the contents of the particular volume. Once mounted, the contents of the volume may be overlaid within the file structure of the virtual machine to make the applications executable. This overlaying may include modifying registry keys to make the application executable from the attached volume, as well as modifying the file structure to make the application appear as though it has been locally installed. For example, when an application storage volume is attached to a virtual machine, the files and directories for the application may appear in the "C:\Program Files" directory, although the executable file components remain stored in the attached volume.

In some implementations, administrators may manage and perform installation processes to store the applications in the application volumes. These installation processes may extract the necessary files and registry keys from an installer, and store the files and registry key files to an appropriate application storage volume. In some examples, the administrator may define application stacks, or groups of applications that are capable of assignment, and provide these groups of applications in one or more application volumes. For example, a first application group may include productivity applications to be supplied to a first set of end users, and a second application group may include video and image editing software to be provided to a second set of end users. Once the applications are stored within the application volumes, the administrator may define which of the applications or volumes are associated with requesting end users.

Here, to manage the applications that are attached to each of the virtual machines, users of the virtual machines may define preferences for applications that they prefer. In particular, the application attach service may be capable of attaching multiple applications that service particular file types. For example, multiple applications may be capable of providing operations with respect to media files. Rather than attaching each of the applications to the virtual machine of an end user, an agent within the virtual machine may present the user with selectable options for a selected file type. Returning to the media file example, if the user selects a media file and no file type association is available for the media file, the agent may provide the user with various attachable applications that support the file type. Once a selection is made, the application may be attached using the operations described above, and in some examples a record may be made of the selection. This record may then be forwarded to the application attach service, such that the application attach service may attach the application to virtual machines to support future virtual computing sessions for the end user.

In this manner, rather than attaching all of the applications that can support a file type, which can use resources of the computing systems within the environment, individualized applications may be attached for each of the users. Further, if a user never requires a particular application for a particular file type, an application ma never be required to be attached to the virtual machine saving further computing resources in the environment.

FIG. 1 illustrates a computing environment 100 to attach application storage volumes to virtual machines according to an implementation. Computing environment 100 includes hosts 110-111, application attach service 150, and application volumes 160. Hosts 110-111, which may comprise server computers, desktop computers, and the like, execute hypervisors 130-131 to provide a platform for virtual machines 120-125. In particular, hypervisors 130-131 abstract the physical computing components of hosts 110-111 and provide virtual components to the virtual-machines. These virtual computing components and resources may include virtual processing systems, virtual storage systems, virtual network interfaces, or some other similar computing element.

In operation, hypervisors 130-131 and virtual machines 120-125 execute on hosts 110-111 to provide virtual computing sessions to end users. In some implementations, end users, may, via remote devices, such as desktop computing systems, laptop computing systems, tablets, smartphones, and the like, provide a login to application attach service 150. Once logged into application attach service 150, application attach service 150 may identify a virtual machine for the end user and initiate a login process to provide the user with access to the virtual machine.

In addition to providing the user with access to a virtual machine, application attach service 150 may further attach applications to the virtual machines. This attachment may occur when the login is received from the user device, based on a request from an agent within the virtual machine, or at some other similar instance. In at least one implementation, users of application attach service 150 may be provided with predefined group applications, wherein the group applications may be stored in group volume(s) 161. These group applications may include one or more applications that are often required for users of application attach service 150, such as an email client, a web browsing client, or some other similar application. To attach these applications, application attach service 150 identifies a virtual machine for an end user and initiates an attach process for the group applications. This attachment may include attaching (mounting or mapping) group volume(s) 161 to the identified virtual machine, and overlaying contents of group volume(s) 161 in the file structure of the virtual machine, such that the files stored in the volumes are readable and executable from the volumes. In some implementations, the attachment of the applications may occur prior to a user logging into application attach service 150. In other implementations, the attachment may occur when the user logs into application attach service 150 or based on a request from an agent within the assigned virtual machine for the end user.

In addition to, or in some examples in place of the defined group applications, virtual machines 120-125 may provide the users with selectable options for applications that are attached to the virtual machine. In particular, when a file open request is generated for a file type that does not currently have an assigned application, application operation 200 (further described in FIG. 2) may be executed by the virtual machines. This operation may be used to provide selectable options to the user of the virtual machine, wherein the options include available applications for the selected file type. Once a selection is made, the application can be attached to the virtual machine, and in some implementations, a notification or, record, may be provided to application attach service 150 indicating the selected application. The information in the notification may then be stored in user selection storage 155, such that during future logins for the associated end user, the selected application may be attached and made available for the end user using attach operation 300 further described in FIG. 3.

FIG. 2 illustrates an operation 200 of a virtual machine to identify file type application preferences of an end user according to an implementation. The processes of operation 200 are referenced parenthetically in the paragraphs that follow with reference to systems and elements of computing environment 100 of FIG. 1. In particular, operation 200 will be described with reference to virtual machine 120, but it should be understood that similar operations may be performed by virtual machines 121-125 of computing environment 100.

In operation, end users may, via a remote computing systems, request and receive access to a virtual machine of virtual machines 120-125. Once allocated a virtual machine, one or more applications may be attached to the virtual machine to provide desired operations to a particular end user. In the present example, when a user is allocated to virtual machine 120, operation 200 is used to identify a file open request for an unassigned file type, and in response to the request, provide (201) the user with available applications to support the file type, wherein the available applications are stored in attachable storage volumes. In some implementations, computing environment 100 may include multiple applications (in available storage volumes) that support file types, such as media file types, code editing file types, text editing file types, or any other similar file type. As a result, rather than attaching all of the applications that support the file types, it may be desirable to only attach applications preferable by the end user.

Once the available applications are provided to the end user, virtual machine 120 may receive (202) a selection of an application from the end user from the available applications. Upon making a selection, virtual machine 120 may generate (203) a record of the selection for the user and generate an attach request to initiate an attach process of the application to the virtual machine. In some implementations, the attach request may include notifying the associated hypervisor (or hypervisor manager for multiple hosts) and/or application attach service 150 to attach the selected application. This attachment of the application may include identifying at least one volume in user volumes 162 to be attached to virtual machine 120, attaching the volume to the virtual machine, and overlaying the contents of the volume within a file structure for the virtual machine to make the application readable and executable from the volume. In some examples, the attach process for the volume may include providing an access path and mount point for the volume to the virtual machine, which may comprise an IP address, a directory name, a file name, or any other path information to access the contents of the particular volume, and overlaying process for the contents may include making an application appear in a native directory of the virtual machine (e.g. "C:\ProgramFiles"), while the executable file components remain stored in the attached volume.

After the application is attached to virtual machine 120, the application may be executed using the executable components stored in the attached volume. Additionally, file type association may be modified on the virtual machine, such that future calls to file types for the application will be directed to the attached application. As an illustrative example, if the user requested an audio media file, once an application is attached that supports the media file, the application may be executed to support the file selection. Additionally, file type association may be performed such that future selections of audio media files are referred to the same application.

In some examples, when the record is made about the selected application, the record may be transferred to application attach service 150, such that the selected application may be attached when the user logs in for future virtual computing sessions. The record may be transferred when the user logs out or terminates the session on virtual machine 120, may be transferred periodically during the usage of virtual machine 120, may be transferred in response to a selection by the user, or may be transferred at some other interval, including combinations thereof. By providing the record to application attach service 150, when the user logs out or terminates the virtual computing session on virtual machine 120 and requests another session from application attach service 150, the virtual machine allocated to the end user may be provided with one or more file type based applications selected by the end user.

While demonstrated in the previous example as attaching applications based on a file type selection, it should be understood that other operations may be used to provide a user with a selection of one or more applications to server a particular purpose. For example, a generic web browser icon may be made available for user selection on virtual machine 120. Once a user selects the icon, multiple browser applications may be presented to the user, permitting the user to select a browser that they prefer. Once selected, the appropriate browser application may be attached to the virtual machine to be made available for future web browsing activities. Although these are two examples of providing a set of applications capable of providing a particular service, it should be understood that other application selection events may require the user to select a desired application.

In some implementations, to provide the list of available applications to the user of the virtual machine, an agent or process may execute on the virtual machine to identify selections of file types that currently do not have an application assigned. Once, a selection for an unknown file type is identified for the end user, the agent may display applications associated with the selected file type, wherein the list of applications may be provided by application attach service 150, may be configured by an administrator when the virtual machine is initiated, or may be provided at some other instance to the virtual machine. Once an application is selected, the agent of the virtual machine may make a record of the selection and provide a record or metadata associated with the selection to application attach service 150. Once provided, application attach service 150 may update a profile for the user, which can include application selections made over one or more virtual computing sessions. Further, the profile for the user may be used to separate selections of a user made using different operating system versions. For example, using a first operating system, a user may prefer that a first web browser is used, whereas, when using a second operating system, the user may prefer that a second web browser is used.

In some examples, to manage the profile of an end user, application attach service 150 may maintain a data structure, which indicates a user identifier, an operating system, and an associated metadata file (a virtual disk, VMDK, or some other file). This metadata file may maintain metadata that indicates which applications were selected by the user for the particular operating system. For example, an array, table, or some other similar construct of ones and zeros may be used to indicate which applications were selected for use by the end user. Consequently, prior to any selections by the end user, the array may include an array of all zeros as no applications have been required and/or selected by the end user. Once a user selects an application at the virtual machine, the virtual machine may initiate a process to modify a zero to a one in the array associated with the application. The file may then be stored in user selection storage 155, such that when the user requires the next virtual computing session, the array from the metadata file may be read to determine the applications to be attached to the next virtual machine.

Further, in some implementations, the user may be provided with the option to erase all or a portion of the metadata file for a particular operating system. For example, if the user desired not to maintain the metadata file, the metadata values within the file will not be updated based on the selections of the user. As a result, although the user may select one or more application during a virtual computing session, the user will be required to select new applications during the next virtual computing session. Additionally, the user may, in some examples, specify that they no longer desire a particular application. This preference may be selected within the virtual machine or by a command with the application attach service. Thus, the metadata file associated with the end user may be updated to remove the selected application for the user.

FIG. 3 illustrates an operation 300 of an application attach service to attach applications to a virtual machine according to an implementation. The processes of operation 300 are referenced parenthetically in the paragraphs that follow with reference to systems and elements of computing environment 100 of FIG. 1.

As depicted in FIG. 3, application attach service 150 identifies (301) an attach request for an end user to attach applications associated with the end user. This attach request may occur when the user provides a virtual computing session request from a remote device, may occur when a user is logged into the virtual machine and the virtual machine requests applications be attached, or may occur for any other similar event. In response to the attach request, application attach service 150 may identify (302) one or more applications for the end user, wherein the applications correspond to file type application preferences selected by the user in at least one previous virtual machine session. To identify the applications associated with the user, application attach service 150 may maintain user selection storage 155, which contains records of selection preferences for end users. Accordingly, based on the end user, application attach service may initiate a search of user selection storage 155 to determine the applications that correspond to the user. Once identified, application attach service 150 may initiate (303) an attach process of the one or more applications to the virtual machine that corresponds to the end user. This attach process may include identifying volumes associated with the identified applications, attaching the volumes to the virtual machines, and overlaying the contents (files, directories, registry objects) within the file structure of the virtual machine as described herein.

As an illustrative example, if a user communicated a request for a virtual machine to application attach service 150, application attach service 150 may allocate a virtual machine of virtual machines 120-125 to the end user and identify one or more applications that should be attached to the virtual machine based on the identity of the end user and the end user's previous application preference selections. Once the applications are identified with their corresponding volumes of user volumes 162, an attach process may be initiated to attach the applications.

In some implementations, a user may be provided with the ability to preserve or destroy their application selections at the end of a virtual computing session. For example, a user may desire that their settings during a session are not carried onto the next session. Consequently, a setting either in the virtual machine or associated with the application attach service may be used to prevent the application settings from being stored. Similarly, a selection may be provided within a virtual machine or by the application attach service permitting the user to cancel previous selections of applications.

While demonstrated in the example of FIG. 3 as attaching applications based on file type preferences for an end user, it should be understood that other applications and/or user volumes may be attached to a virtual machine. For example, group volume(s) 161 may include one or more applications that are attached for all users of the computing environment. Further, in addition to or in place of the group applications, one or more user volumes may be attached to a virtual machine that provide read/write operations for the particular end user. In particular, the application volumes that are attached to the virtual machine may be read-only and prevent the user from storing or modifying data within the virtual machine. Consequently, to permit the user to store files and settings related to the applications, a user volume may be attached that can be written to and read from by the user. This volume may have its contents overlaid within the file structure, such that the user volume is prioritized over other attached volumes and data that is locally stored on the virtual machine.

Figure 4:
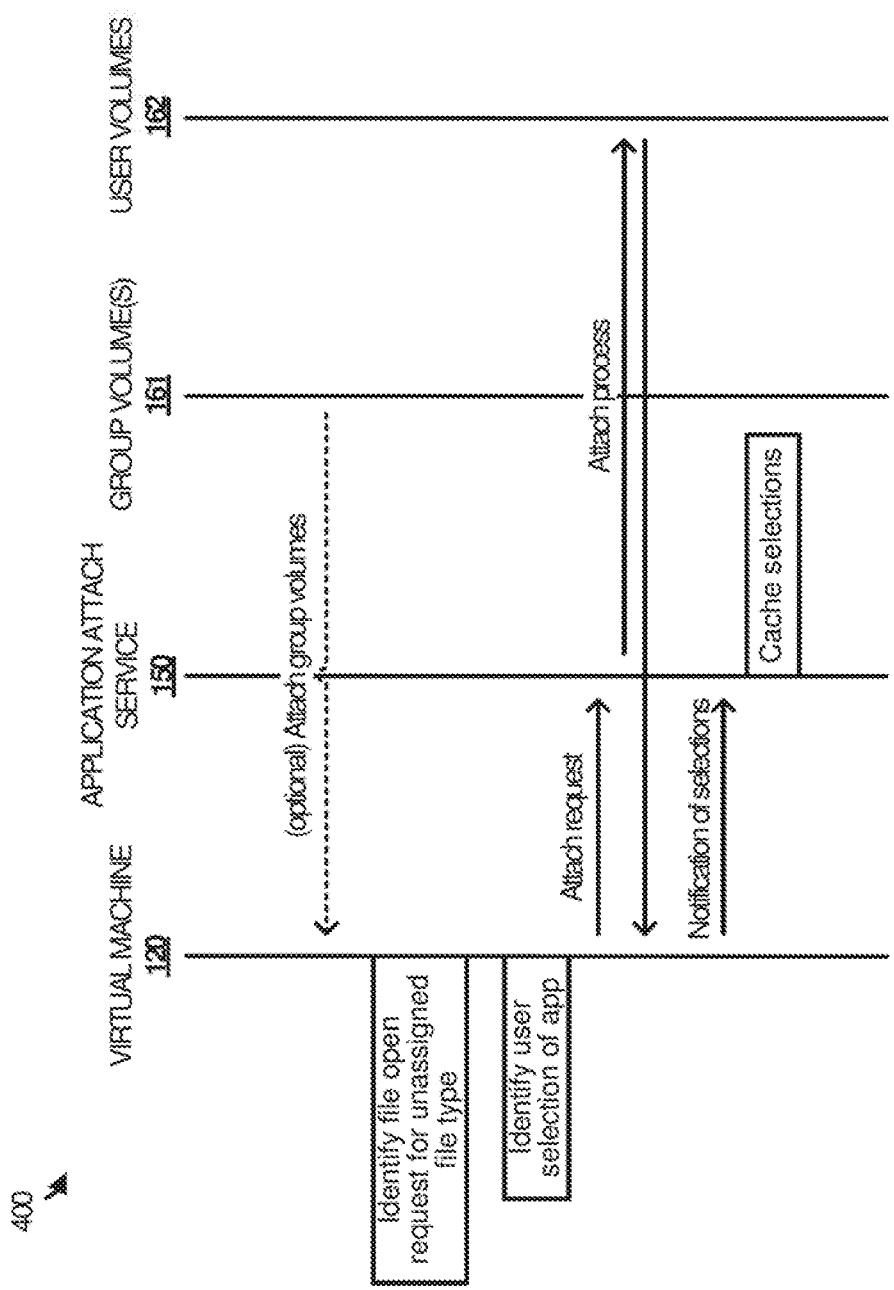
FIG. 4 illustrates a timing diagram of identifying file type application preferences of an end user according to an implementation.

FIG. 4 illustrates a timing diagram 400 of identifying file type application preferences of an end user according to an implementation. Timing diagram 400 includes virtual machine 120, application attach service 150, group volume(s) 161, and user volumes 162 from computing environment 100 of FIG. 1.

As depicted in timing diagram 400, a virtual machine 120 may be allocated to an end user of the computing environment. In some implementations, the allocated virtual machine may be allocated group applications via group volume(s) 161. These group applications may comprise applications that are made available to all users of the service, and may be attached prior to the user login to the service, or may be attached when the user logs into the service. These applications may include commonly used applications such as productivity applications or some other type of applications.

Once virtual machine 120 has been allocated to a user and the user has been logged into the virtual machine, virtual machine 120 may identify a file open request for an unassigned file type. For example, if a media file were selected by the user of virtual machine 120, but no application was associated with the file type for the media, a list of available attachable applications may be provided to the end user. Once provided, the user may select an application, which in turn generates an attach request for application attach service 150 to provide an attach process to attach the selected application to the virtual machine. In response to the request for the attach process, application attach service 150 may initiate the attach process for the application, wherein the attach process may include attaching the volume of user volumes 162 to the virtual machine that corresponds to the requested application, and overlaying the components in the volume in the file structure of the virtual machine. Once the application is attached, the user of virtual machine 120 may execute the application as if the application had been locally installed, although the executable files remain stored in the attached volume.

In addition to attaching the application for the current session of the virtual machine, virtual machine 120 may also provide a record or notification to application attach service 150 indicating the application that was requested for the virtual machine. This record may, in some examples, be provided as part of the attach request. In other implementations, the selection record may be provided at various intervals, such as periodically, when the user logs out of virtual machine 120, or at any other interval. Once the notification of the selections is provided to application attach service 150, application attach service 150 may cache the selections as file type preferences to permit the application to be attached during future virtual computing sessions.

In some implementations, the user of virtual machine 120 may be provided with an option to maintain the record of the selected applications. As a result, if the user selects to not maintain the selected applications, a record may not be maintained and the selected applications will not be attached during the next user login. In contrast, if the user selects to maintain the applications, then the applications will be attached in future requested virtual computing sessions.

Figure 5:
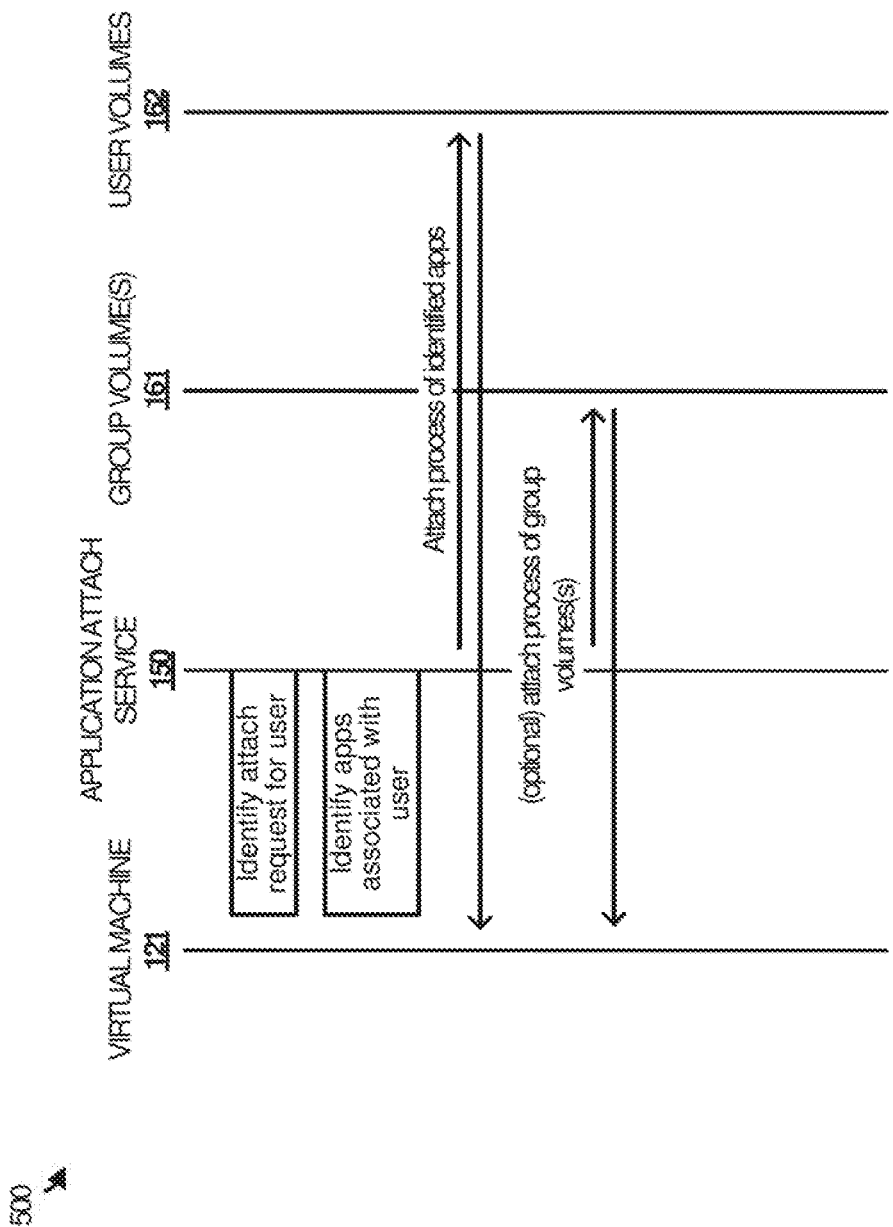
FIG. 5 illustrates a timing diagram to attach applications to a virtual machine according to an implementation.

FIG. 5 illustrates a timing diagram 500 to attach applications to a virtual machine according to an implementation. Timing diagram 500 includes virtual machine 120, application attach service 150, group volume(s) 161, and user volumes 162 from computing environment 100 of FIG. 1.

As described herein, application attach service 150 may be used to maintain a record of the file type applications desired by users of the service. While maintaining the record of applications, application attach service 150 may identify an attach request for a user. This request may occur when the user logs into the service to request a virtual computing session, when the user is logged into the virtual machine, or at some other instance. In response to the request, application attach service 150 may identify applications associated with the user. These applications may be identified based credentials supplied by the user, such as a username, password, or some other credential. Once the applications are identified, application attach service 150 initiates an attach process of the identified applications.

Here, to attach the required applications, application attach service 150 may identify one or more volumes in user volumes 162. Once the volumes are identified, the volumes may be attached to the virtual machine and the contents overlaid in the file structure to make the application executable. In some implementations, the applications may be attached prior to the user completing a login process to the virtual machine, however, in other implementations, the applications may be attached after the user has been logged into the virtual machine.

As also illustrated in FIG. 5, as an optional step, application attach service 150 may also attach group applications from group volume(s) 161. Group applications may comprise applications that are allocated to a group of users by default that are not selectable by the user within the virtual machine. For example, a set of productivity applications may be assigned to all users of application attach service 150. Consequently, when a virtual computing session is requested by one of the users, the productivity applications may be attached for the user at login to the virtual machine.

FIG. 6 illustrates a data structure 600 for attachable applications to a virtual machine according to an implementation. Data structure 600 includes columns for file types 612, and application options 614-616 with applications 620-631. While demonstrated with three application options for each of the file types, it should be understood that any number of applications may be made available for file types. Further, while demonstrated as a table, it should be understood that one or more linked lists, arrays, tables, and the like may be used to manage the available attachable applications for the virtual machine.

In operation, a user may be provided a virtual machine as part of a virtualization service. During execution of the virtual machine, the user may select an unassigned file type and/or may select a generic icon for particular application type. For example, the virtual machine may include a generic web browsing icon to request the launch of a web browsing application. In response to the user request for a particular type of application, the virtual machine may identify a set of application options that could be used to support the request. Using the example of the generic web browsing icon, responsive to a request for the web browser, the user may be provided with a list of applications 623-625 that can be used to support the request. This list maybe provided via a graphic interface of the virtual machine, such that the user may select one of the available applications. Once an application is selected, the application may be attached to the virtual machine to make the application executable without local installation.

In some implementations, after the user has selected a particular application, a notification may be provided from the virtual machine to the application attach service that is responsible for allocating virtual machines in the computing environment. Once provided, the application attach service may cache the selection of the end user, such that the application may be attached to future virtual computing session requests. Thus, once the user logs out of the virtual machine and requests a new computing session, the attach service may initiate an attach process to attach the application at user login.

FIG. 7 illustrates a data structure 700 for associating end users with file type applications according to an implementation. Data structure 700 includes columns for file types 612 (from data structure 600 of FIG. 6), and users 710-712. Although illustrated as a table in the present implementation, it should be understood that one or more tables, arrays, linked lists, and the like may be used to manage the applications assigned to each of the users.

As described previously, as users require applications for different file types, the application attach service for a computing environment may be responsible for caching information about the selected applications. Here, user 710 has, selected application 620 for media file types, and application 623 for web browsing file types, whereas users 711-712 are allocated a different set of applications based on their previous selections and preferences. As a result, when a virtual computing session is required by each of the users, the application attach service may be responsible for identifying applications for each of the users and initiating an attach process to make the applications available for execution for the end users. In particular, rather than requiring the attachment of unnecessary applications, data structure 700 may be used to ensure that only desired applications for particular file types are attached to the virtual machines.

In some implementations, the end users may be able to select whether or not their application selections are maintained or cached by the attachment service. For example, the user may be provided with a selection, either in the virtual machine or in the login process for the virtual computing environment, whether application selections should be preserved. If the user selects that the applications are to be preserved, their profile represented in data structure 700 may be updated maintained based on application requirements for the user. In contrast, if the user prefers not to maintain a record of selected applications, the user may be required to select an application for file types during each virtual computing session.

In some examples, the profile for the user in data structure 700 may be updated over multiple virtual computing sessions. For example, during a first session, user 711 may select applications 620 and 624 to provide required operations. However, the selection of application 630 may occur at a later session with the computing environment. Moreover, in some implementations, a user may be capable of dynamically removing applications from their profile to prevent applications from being attached during future computing sessions.

In some implementations, to manage the profiles for multiple users over multiple operating systems, a data structure may be maintained that indicates a user identifier, an operating system, and a metadata file that provides information about the applications selected for the end user using the particular operating system. This metadata file may comprise a virtual disk, a VMDK, or some other metadata file. To manage the metadata file, the user may first be allocated a default metadata file, wherein the file may include an array or table that indicates zeros for the selected applications. As the user selects applications for file types in the virtual machine, the metadata file may be updated (changing, zeros to ones) that correspond to the selected application. For example, if the second zero in an array were associated with a particular web browser, the second zero may be changed to a one when the user selects a preference to use the particular web browser. This metadata file may then be stored by the application attach service, such that the metadata file may be carried over (if preferred) to future computing sessions and can further be updated during the future computing sessions. Thus, when a login for the user is detected, the application attach service may identify the user and the operating system for the virtual computing session, and attach applications based on the metadata in the associated metadata file, wherein the metadata values correspond to specific applications.

Figure 8:
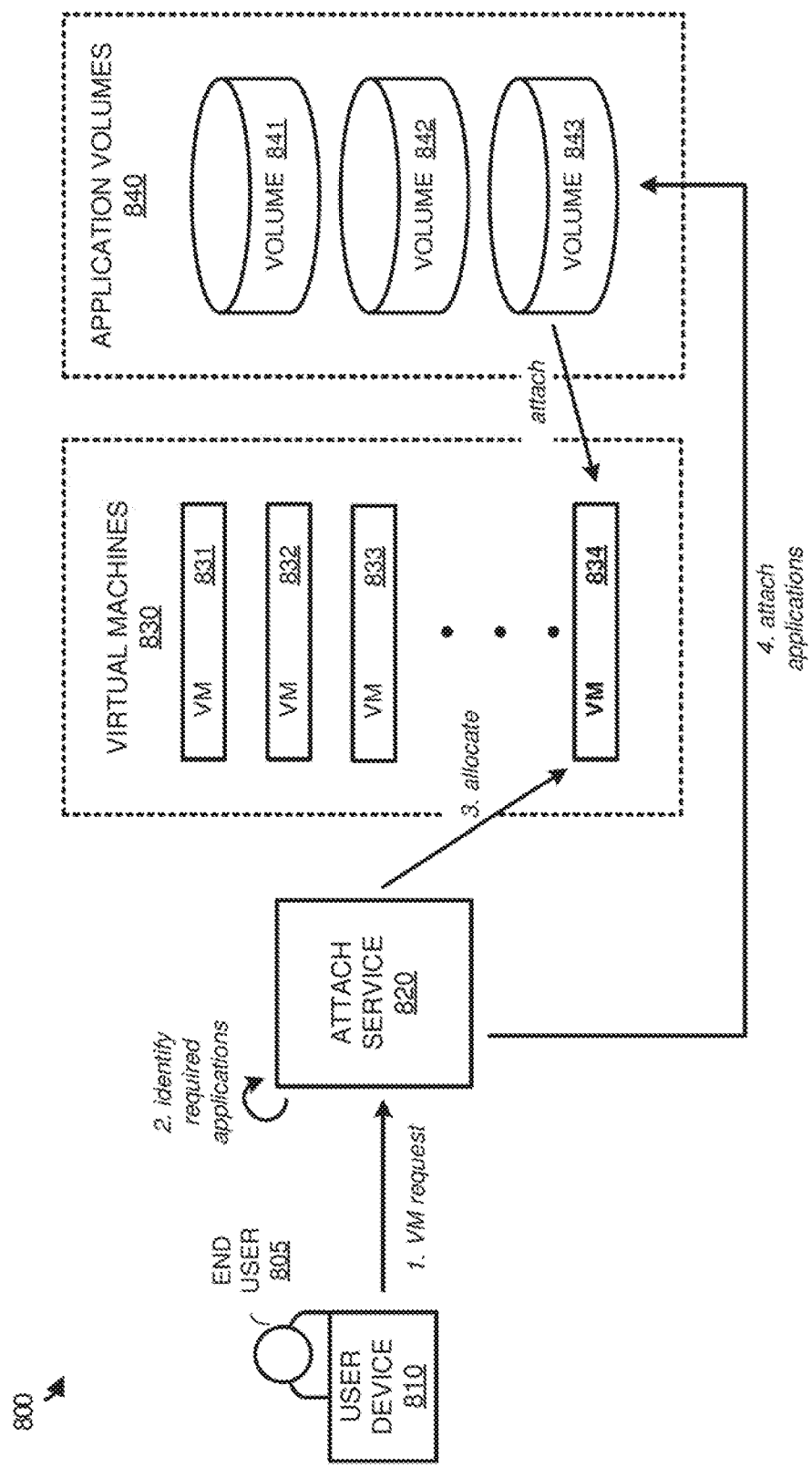
FIG. 8 illustrates an operational scenario of providing a user with a virtual computing session according to an implementation.

FIG. 8 illustrates an operational scenario 800 of providing a user with a virtual computing session according to an implementation. Operational scenario 800 includes user device 810 for end user 805, attach service 820, virtual machines 830, and application volumes 840. Attach service 820 is representative of one or more computing systems capable of allocating and initiating an attach process for virtual machines. Virtual machines 830 includes virtual machines (VMs) 831-834 and application volumes 840 include volumes 841-843, wherein the virtual machines and the application volumes may be operated and stored on one or more physical computing devices.

In operation, end user 805 may, via user device 810 provide a request to, application attach service 820 for a virtual computing session, at step 1. In response to the request, attach service 820 will identify, at step 2, required applications for the end user. These applications may include applications that are associated with a group of end users, and may further include individualized applications selected by the user during operation with a virtual machine. In particular, based on file type requests within the virtual machine, the user may be provided with, and select from, a list of available attachable applications to the virtual machine. Once the user selects the desired applications, a record may be made of the selections and used in attaching applications for future sessions. For example, if a user desired to open a video media file, a list of applications may be provided to the user to support the media file. Once an application is selected, the application may be attached to the virtual machine, and a record made of the selection for future sessions.

Here, responsive to the request of end user 805, attach service 820, at step 3 allocates an available to the virtual machine 834, and attaches, at step 4, the required applications to the virtual machine. Virtual machine 834 may be a virtual machine that is currently idle on a host computing system, or may comprise a virtual machine that is started to support the request from end user 805. In some implementations, to attach the application for virtual machine 634, attach service 820 may direct a hypervisor for virtual machine 834 to attach (mount or map) volume 843, and once attached, an agent in the virtual machine may overlay the contents of volume 843 within a file structure of the machine.

In some implementations, the remote connection between the virtual machine and the end user device 810 can be implemented using a desktop remoting technology, such as Remote Desktop Services (RDS), Virtual Desktop Infrastructure (VDI), Desktop-as-a-Service (DAAS) or the like. Using such desktop remoting technologies, a user can be allowed to access a virtual desktop or application executing on a virtual machine over a remote network connection, such as a WAN connection. The virtual machine is hosted on a server that is physically located in a data center remotely located with respect to the end user device. When the device is used to access the virtual machine, the virtual machine (and associated applications) execution takes place on the remote host server which is linked to the end user device over a network, using a remote display protocol such as remote desktop protocol (RDP), PC-over-IP (PCoIP), Blast, virtual network computing (VNC), or the like. Using such a remote desktop protocol, the user can interact with the virtual machine hosted on the remote host server, such that only the display, keyboard, and mouse information is communicated with the end user device.

When the end user device is accessing the virtual machine using a remote desktop protocol, the graphical user interface (GUI) of the desktop is generated on the server hosting the virtual machine and the GUI image data is then encoded and transmitted, over the network to the client device, where it is decoded and displayed to the user. For example, the framebuffer pixel data produced by the virtual machine may be encoded using a codec, such as H264, and transmitted over an Internet connection to the end user device, where the data is decoded and rendered in a window displayed on the screen of the end user device. Any user input information, such as keyboard and mouse events detected over the secure browser window on the end user device, are transmitted from the device to the virtual machine over the network connection, where it may in turn cause various updates thereon. In this manner, the user is able to view the GUI of the virtual machine and interact with it as if the virtual machine was actually running on the local end user device.

Although not illustrated in the present example, it should be understood that when the user terminates a session, either by logging out of the virtual machine or terminating the locally executing remote desktop application, the applications may be detached from the virtual machine. This detachment may remove any files of the attached volume from the file structure and detach (unmount) the application volume from the virtual machine. Consequently, when a second user requests a virtual session, applications associated with the second user may be attached to the virtual machine.

Figure 9:
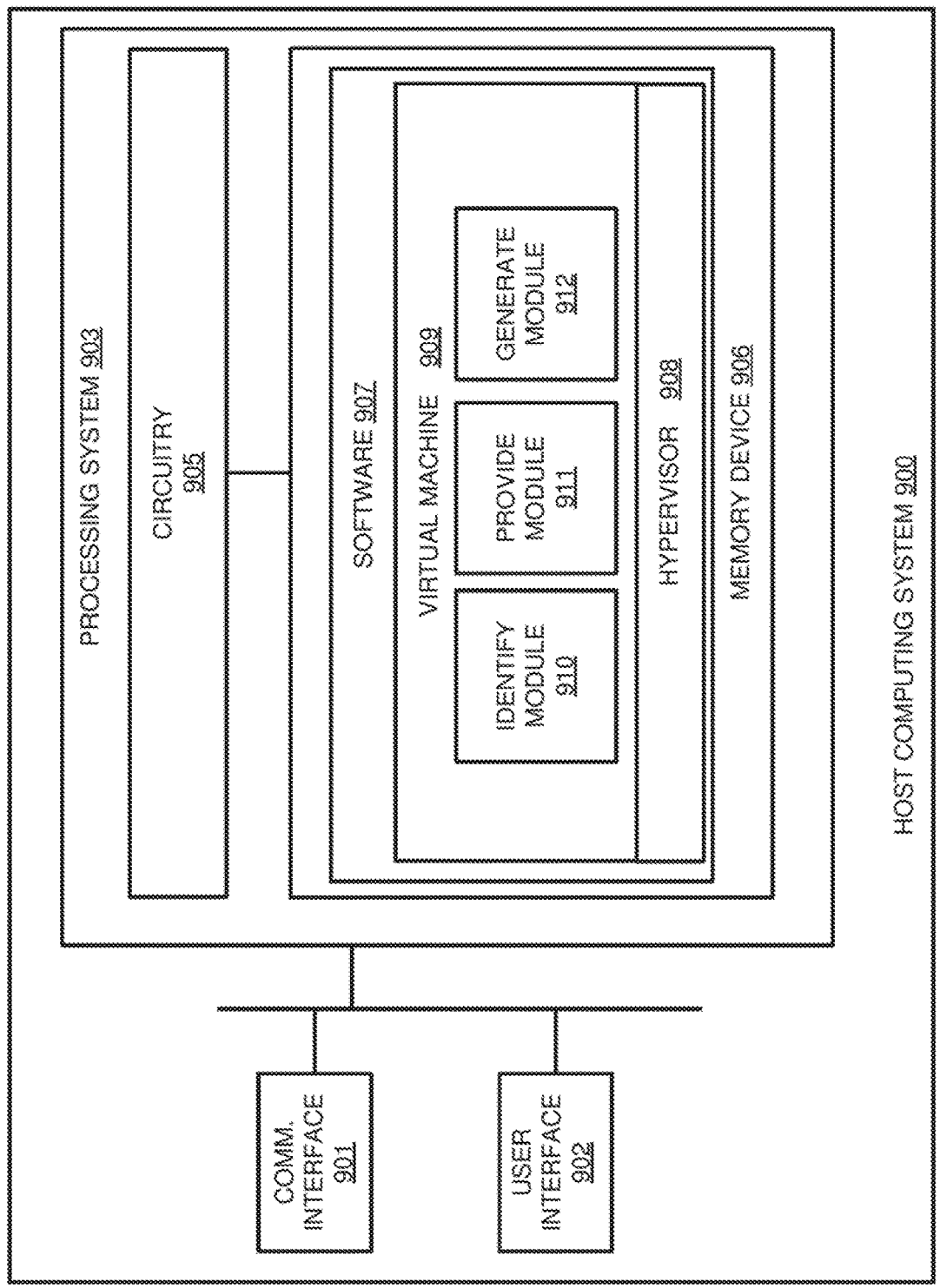
FIG. 9 illustrates a host computing system for at least one virtual machine according to an implementation.

FIG. 9 illustrates a host computing system 900 for at least one virtual machine according to an implementation. Computing system 900 is representative of any computing system or systems with which the various operational architectures, processes, scenarios, and sequences disclosed herein for a host computing system may be implemented. Computing system 900 is an example host described in FIGS. 1-8, although other examples may exist. Computing system 900 comprises communication interface 901, user interface 902, and processing system 903. Processing system 903 is linked to communication interface 901 and user interface 902. Processing system 903 includes process in circuitry 905 and memory device 906 that stores operating software 907. Computing system 900 may include other well-known components such as a battery and enclosure that are not shown for clarity. Computing system 900 may comprise a serving computing system, a desktop computing system, or some other type of computing system.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In some implementations, communication interface 901 may be configured to communicate with an application attach service that manages the attachment of applications to virtual machines. In some examples, communication interface 901 may be configured to communicate with one or more storage systems or computing devices that serve as a repository for the application storage volumes.

User interface 902 comprises components that interact with a user to receive user inputs and to present media and/or information. User interface 902 may include a speaker, microphone, buttons, lights, display screen, touch screen, touch pad, scroll wheel, communication port, or some other user input output apparatus—including combinations thereof. User interface 902 may be omitted in some implementations.

Processing circuitry 905 comprises microprocessor and other circuitry that retrieves card executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes hypervisor 908, which provides a platform for virtual machine 909 and software modules 910-912, although any number of software modules may provide similar operations. Operating software 907 may further include an operating system, utilities, drivers, network interfaces, applications, or some other type of software. When executed by processing circuitry 905, operating software 907 directs processing system 903 to operate computing system 900 as described herein.

In at least one implementation, a user may be provided with a remote connection to virtual machine 909. During the execution of virtual machine 909, identify module 910 directs processing system 903 to identify a request to use an unassigned file type. For example, a user may select a video media file with no currently assigned applications to support the request. After identifying the request, provide module 911 directs processing system 903 to provide the user with available applications to support the file type and receive a selection of an application from the user associated with virtual machine 909. Once a selection is made, generate module 912 directs processing system 903 to generate a record of the selection for the user and generate an attach request to initiate an attach process of the selected application to the virtual machine. This attach request may be communicated to the application attach service to initiate the attach process or, in some examples, may be provided to a hypervisor (or hypervisor manager for multiple hypervisors). In some implementations, the record may be provided to the application attach service that assigns users and applications to virtual machines, such that the application attach service may maintain file type preferences for the end user.

Once the application is attached via the requested attach process, the application may be capable of execution on the virtual machine. Consequently, using the example of the video media file provided previously, the attached application may be configured to execute upon attachment to support the selection of the video media file.

Figure 10:
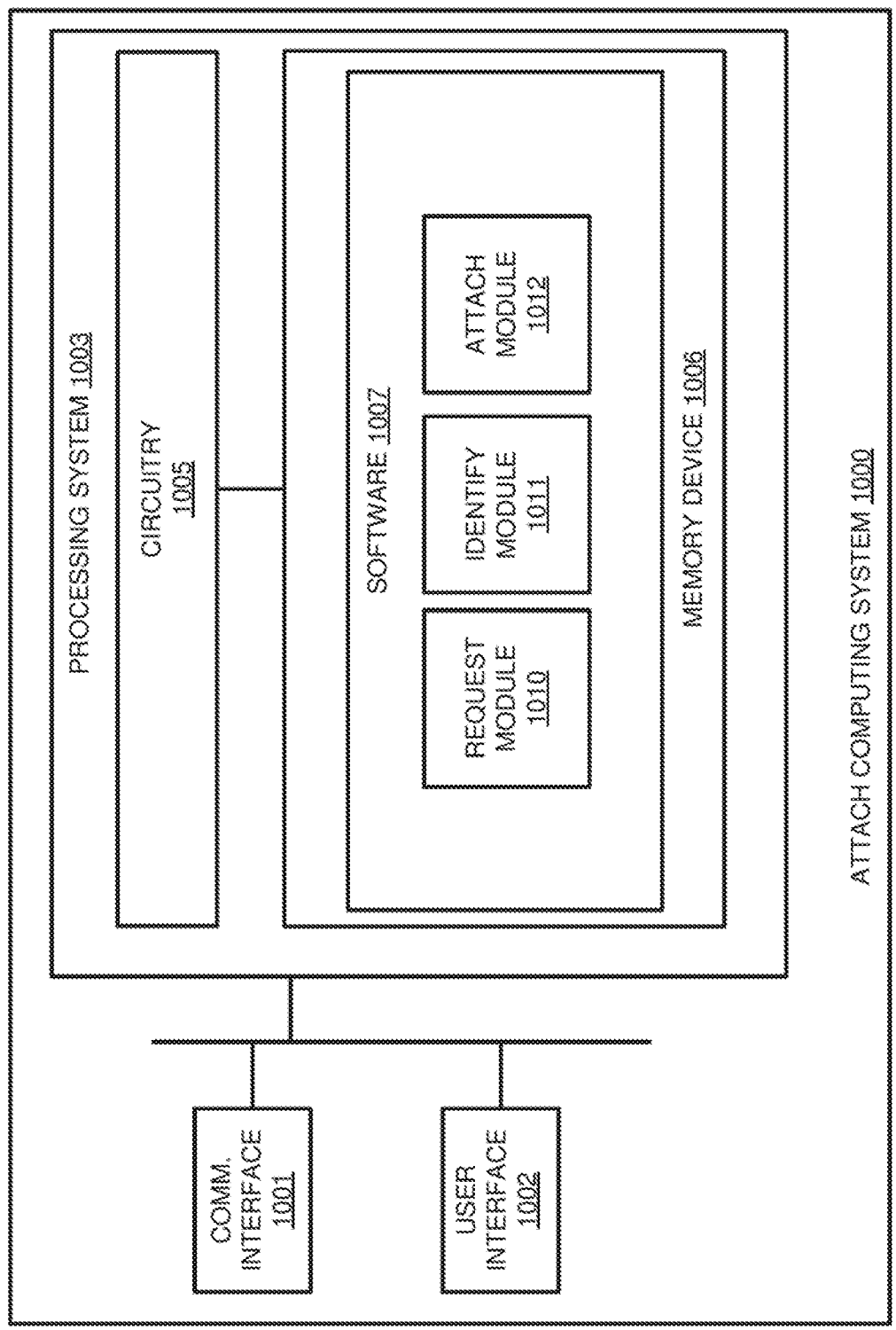
FIG. 10 illustrates an attach service computing system according to an implementation.

FIG. 10 illustrates an attach service computing system 1000 according to an implementation. Computing system 1000 is representative of any computing system or systems with which the various operational architectures, processes, scenarios, and sequences disclosed herein for an application attach service may be implemented. Computing system 1000 is an example of the application attach services described in FIGS. 1-8, although other examples may exist. Computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007. Computing system 1000 may include other well-known components such as a battery and enclosure that are not shown for clarity.

Communication interface 1001 comprises components that communicate over communication links, such as network cards, ports, radio frequency (RF), processing circuitry and software, or some other communication devices. Communication interface 1001 may be configured to communicate over metallic, wireless, or optical links. Communication interface 1001 may be configured to use Time Division Multiplex (TDM), Internet Protocol (IP), Ethernet, optical networking, wireless protocols, communication signaling, or some other communication format including combinations thereof. In some implementations, communication interface 1001 may be configured to communicate with one or more host computing systems for virtual machines capable of attaching applications. In some examples, communication interface 1001 may be configured to communicate with one or more storage systems or computing devices that serve as a repository for the application storage volumes. In some implementations, communication interface 1001 may further be configured to receive and allocate requests from end user devices to virtual machines in a computing environment.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input output apparatus—including combinations thereof. User interface 1002 may be omitted in some implementations.

Processing circuitry 1005 comprises microprocessor and other circuitry that retrieves and executes operating software 1007 from memory device 1006. Memory device 1006 may include volatile and nonvolatile, removable and non-removable media implemented in any method or technology for storage of information, such as computer readable instructions, data structures, program modules, or other data. Memory device 1006 may be implemented as a single storage device, but may also be implemented across multiple storage devices or sub-systems. Memory device 1006 may comprise additional elements, such as a controller to read operating software 1007. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that m no case is the storage media a propagated signal.

Processing circuitry 1005 is typically mounted on a circuit board that may also hold memory device 1006 and portions of communication interface 1001 and user interface 1002. Operating software 1887 comprises computer programs, firmware, or some other form of machine-readable program instructions. Operating software 1007 includes request module 1010, identify module 1011, and attach module 1012, although any number of software modules may provide similar operations. Operating software 1007 may further include an operating system, utilities, drivers, network interfaces, applications, or some other type of software. When executed by processing circuitry 1005, operating software 1007 directs processing system 1003 to operate computing system 1000 as described herein.

In at least one example, request module 1010 directs processing system 1003 to identify an attach request for an end user. This request maybe provided from a remote end user device, or may be provided from a virtual machine on a host computing system. In response to the request, identify module 1011 directs processing, system 1003 to identify one or more applications for the end user, wherein the applications correspond to file type application preferences selected by the user in a previous virtual computing session in the computing environment. Once the applications are identified, attach module 1012 directs processing system 1003 to initiate an attach process of the one or more applications to a virtual machine for the end user. In some implementations, the virtual machine may be allocated by computing system 1000 upon request for a virtual computing session from an end user device.

Although not required, in some implementations in addition to the individualized applications provided to the virtual machine, computing system 1000 may also be configured to attach group applications that are made available to multiple users that access the virtual computing environment. In particular, at user login time to the service or virtual machine, computing system 1000 may have one or more applications that are associated with a group of end users. For example, if users required access to productivity applications, then computing system 1000 may initiate an attach process of the productivity applications without the requirement of the user selecting the applications from a list during the virtual computing session.

Figure 11:
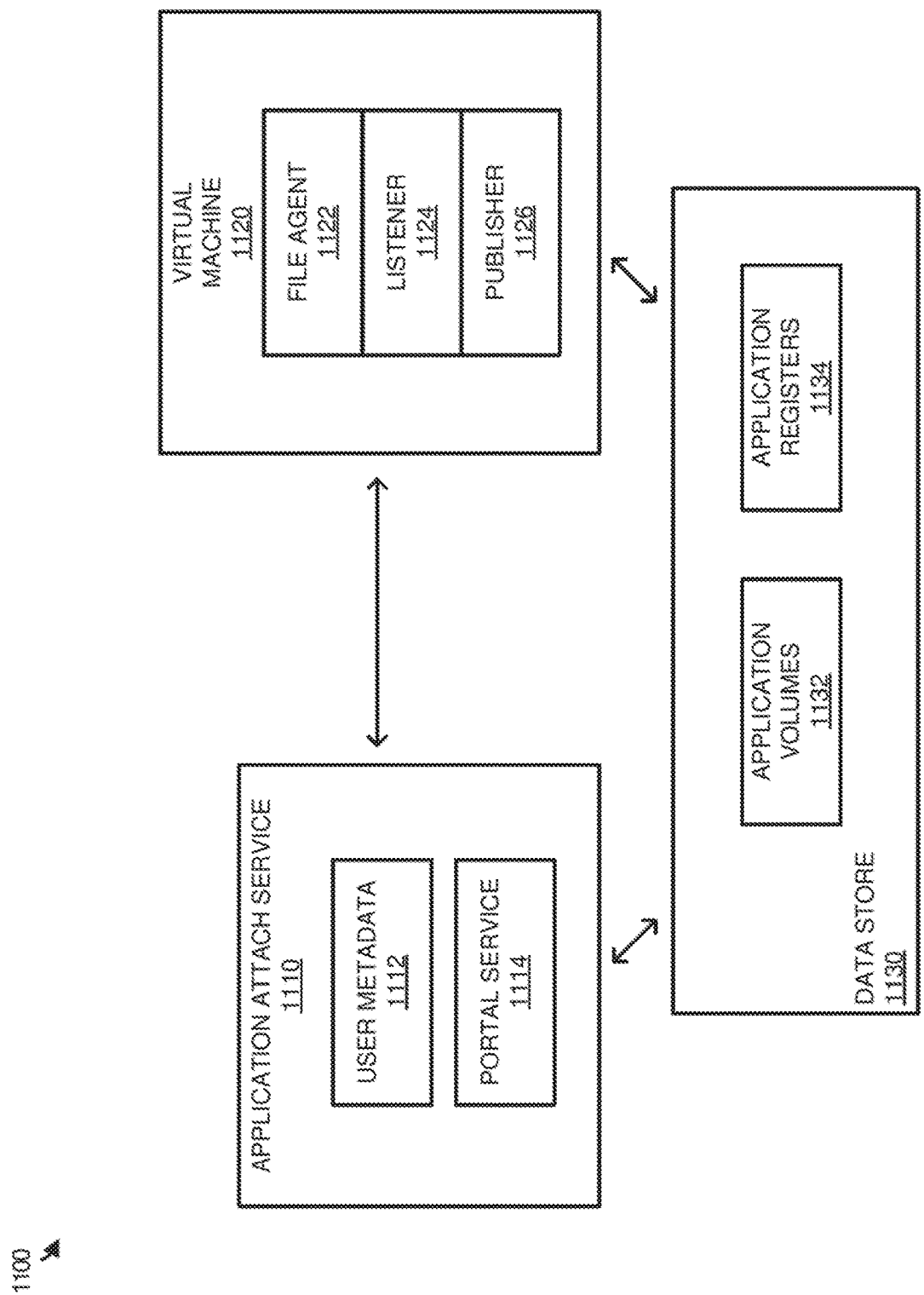
FIG. 11 illustrates a computing environment to attach application storage volumes to a virtual machine according to an implementation.

FIG. 11 illustrates a computing environment 1100 to attach application storage volumes to a virtual machine according to an implementation. Computing environment 1100 includes application attach service 1110, virtual machine 1120, and data store 1130. Application attach service 1110 further includes user metadata 1112 and portal service 1114. Virtual machine 1120 further includes file agent 1122, listener 1124, and publisher 1126. Data store 1130 further includes application volumes 1132 and application registers 1134.

In operation, a user may be allocated to virtual machine 1120. Once allocated, file agent 1122 on the virtual machine may monitor for a file open request for an unassigned file type. In response to identifying the request, file agent 1122 may communicate with application attach service 1110 to identify applications, available for attachment to the virtual machine. Once received at application attach service 1110, portal service 1114 may provide available applications associated with the requested file type to publisher 1126 on the virtual machine. In some implementations, portal service 1114 may be configured by an administrator of the computing environment with available applications for each file type, wherein the applications correspond to available applications stored in application volumes 1132. For example, the administrator may define, which applications and corresponding application volumes of application volumes 1132, are available to support a media file type.

Once the available applications are provided to publisher 1126, publisher 1126 may be used generate an interface to present the available applications to the user of virtual machine 1120. After the available selections are provided to the user of virtual machine 1120, listener 1124 monitors for a selection of one of the applications. Responsive to a selection, listener 1124 may request that the required application is attach via application volumes 1132 to virtual machine 1120. This may include directing or requesting application attach service 1110 to attach the application in some implementations, wherein attaching the requested application may include mounting the required application volume and overlaying the contents of the volume in virtual machine 1120.

In addition to attaching the requested application, listener 1124 may further be used to update an application register of application registers 1134. In particular, when a user is first allocated a virtual machine as part of the virtualization service, an application register of application registers 1134 may be generated from a template register. This template register is used to store file type application preferences for the end user of the virtual machine. In some implementations, the register may include a bit-map for applications to be made available for the user of the virtual machine. For example, a value in the bit-map may be set to "0" when an application has not been selected or allocated to the end user, and may be set to a "1" when an application has been selected or allocated to the user of the virtual machine. Returning to the example, of a user selecting a new application for a particular file type, listener 1124 may identify the application selected and update the corresponding value in the register file to reflect the selection.

In some implementations, application registers 1134 may represent virtual disk files, such as VHDs or VMDKs. As a result, when a selection of an application is made within the virtual machine, listener 1124 may provide a notification of the selection to application attach service 1110 to update the associated register for the user. Once updated, and the user logs out of virtual machine 1120, the user may log into the same virtual machine or a different virtual machine in the computing environment and be provided with the same application. In some examples, when generating the application registers, the user or an administrator of the computing environment may be capable of configuring the register such that the selections are not saved during the session. Thus, when the user selects an application, the application may be attached to the current session, but will not be provided in future sessions.

To manage the application registers, application attach service 1110 may maintain user metadata 1112, which is used to identify the application registers of application registers 1134 associated with particular users. In some implementations, user metadata 1112 may include a data structure, which can associate a user identifier, and in some examples an operating system version, with an application register for the user. As a result, when a user requests a virtual computing session, application attach service 1110 may consult user metadata 1112 to determine if an application register is available for the user. If a register is available, then the applications associated with the user may be attached to a virtual machine based on the preferences in the register. In contrast, if a register is not available for the user, then a new register may be generated for the user based on the template, and applications may be attached based on the template. Once an application register is identified or generated for the user, the register may then be updated as listener 1124 identifies selections of the user of virtual machine 1120. In some implementations, the application register may be updated as users select new applications, however, it should be understood that the register may be update periodically, when the user logs out of the virtual machine, or, at any other interval.

Once the user logs out of the virtual machine and the register is saved in application registers 1134, the user may request a second virtual session. When the user is allocated a virtual machine to support the second virtual session, the application register may be identified for the user from application registers 1134 using user metadata 1112. Once identified, the associated applications may be attached to the virtual machine to make the applications executable for the end user.

Although not illustrated in the example of computing environment 1100, it should be understood that an administration console may be provided that interacts with application attach service 1110. This administration console may be used to define the template register, wherein the template may include one or more applications that are pre-allocated for users of the computing environment.

Returning to the elements of FIG. 1, application attach service 150 may comprise communication interfaces, network interfaces, processing, systems, computer systems, microprocessors, storage systems, storage media, or some other processing devices or software systems, and can be distributed among multiple devices. Examples of application attach service 150 can include software such as an operating system, logs, databases, utilities, drivers, natural language processing software, networking software, and other software stored on a computer-readable medium. Application attach service 150 may comprise, in some examples, one or more server computing systems, desktop computing systems, laptop computing systems, or any other computing system, including combinations thereof.

Hosts 110-111 may each comprise communication interfaces, network interfaces, processing systems, computer systems, microprocessors, storage systems, storage media, or some other processing devices or software systems, and can be distributed among multiple devices. Hosts 110-111 can each include software such as an operating system, logs, databases, utilities, drivers, natural language processing software, networking software, and other software stored on a computer-readable medium. Hosts 110-111 may each comprise a serving computing system, a desktop computing system, or some other similar computing system.

Application volumes 160 may reside on any computing system or systems that can include communication interfaces, network interfaces, processing systems, computer systems, microprocessors, storage systems, storage media, or some other processing devices or software systems, and can be distributed among multiple devices. Application volumes 160 may be located on one or more server computing systems, desktop computing systems, laptop computing systems, or any other computing system, including combinations thereof. Although illustrated separate from hosts 110-111, it should be understood that application volumes 160 may be stored locally on hosts 110-111 in some implementations.

Communication between application attach service 110, hosts 110-111, and application volumes 160 may use metal, glass, optical, air, space, or some other material as the transport media. Communication between application attach service 110, hosts 110-111, and application volumes 160 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between application attach service 110, hosts 110-111, and application volumes 160 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementation. As a result, the invention is not limited to the specific implementations described above, but only by the claims and their equivalents.

What is claimed is:

1. A method comprising:
in response to a file open request in a first virtual machine for a file type without an assigned application, providing an end user of the first virtual machine with one or more applications available to support the file type, wherein the one or more applications reside in one or more attachable storage volumes;
receiving a selection of an application of the one or more applications;
in response to the selection, initiating a first attachment process of the application to the first virtual machine;
transferring a record of the selection of the application to support the file type to an application attach service;
in the application attach service, updating a profile for the user to include the application for the file type;
in the application attach service and after updating the profile, identifying a request for a second virtual machine for the end user;
in response to the request and in the application attach service, identifying the application for the end user based on the profile; and
initiating a second attachment process of the application to the second virtual machine to make the application executable in the second virtual machine for the file type.

2. The method of claim 1, wherein identifying the request comprises receiving a service login associated with the end user to initiate the second virtual machine.

3. The method of claim 1, wherein identifying the request comprises receiving a request from the second virtual machine to attach one or more applications associated with the end user.

4. The method of claim 1, wherein the second attachment process comprises attaching at least one storage volume of the one or more storage volumes that stores the application to the second virtual machine, and overlaying contents of the at least one storage volume in a file structure of the second virtual machine to make the application executable from the at least one storage volume.

5. The method of claim 4, wherein initiating the second attachment process of the application to the second virtual machine comprises notifying a hypervisor for the second virtual machine to attach the at least one storage volume.

6. The method of claim 4, wherein the at least one storage volume comprises at least one read-only storage volume capable of attachment to a plurality of virtual machines.

7. The method of claim 1 further comprising initiating a third attachment process of one or more additional applications to the second virtual machine, wherein the one or more additional applications are allocated to a group of end users.

8. The method of claim 1 further comprising receiving a notification from the second virtual machine indicative of one or more application selections by the end user using the second virtual machine, and updating the profile based on the notification.

9. A computing apparatus comprising:
one or more non-transitory computer readable storage media;
a processing system operatively coupled with the one or more non-transitory computer readable storage media; and
program instructions stored on the one or more non-transitory computer readable storage media to attach applications to virtual machines of a computing environment that, when read and executed by the processing system, direct the processing system to:
in response to a file open request in a first virtual machine for a file type without an assigned application, provide an end user of the first virtual machine with one or more applications available to support the file type, wherein the one or more applications reside in one or more attachable storage volumes;
receive a selection of an application of the one or more applications;
in response to the selection, initiate a first attachment process of the application to the first virtual machine;
transfer a record of the selection of the application to support the file type to an application attach service;
in the application attach service, update a profile for the user to include the application for the file type;
in the application attach service and after updating the profile, identifying a request for a second virtual machine for the end user;
in response to the request and in the application attach service, identify the application for the end user based on the profile; and
initiate a second attachment process of the application to the second virtual machine to make the application executable in the second virtual machine for the file type.

10. The computing apparatus of claim 9, wherein the program instructions to identify the request direct the processing system to receive a service login associated with the end user to initiate the second virtual machine.

11. The computing apparatus of claim 9, wherein the program instructions to identify the request direct the processing system to receive a request from the second virtual machine to attach one or more applications associated with the end user.

12. The computing apparatus of claim 9, wherein the second attachment process comprises attaching at least one storage volume of the one or more storage volumes that stores the application to the second virtual machine, and overlaying contents of the at least one storage volume in a file structure of the second virtual machine to make the application executable from the at least one storage volume.

13. The computing apparatus of claim 12, wherein the program instructions to initiate the second attachment process of the application to the second virtual machine direct the processing system to notify a hypervisor for the second virtual machine to attach the at least one storage volume.

14. The computing apparatus of claim 12, wherein the at least one storage volume comprises at least one read-only storage volume capable of attachment to a plurality of virtual machine.

15. The computing apparatus of claim 9, wherein the program instructions further direct the processing system to initiate a third attachment process of one or more additional applications to the second virtual machine, wherein the one or more additional applications are allocated to a group of end users.

16. The computing apparatus of claim 9, wherein the program instructions further direct the processing system to receive a notification from the second virtual machine indicative of one or more application selections by the end user using the second virtual machine, and update the profile based on the notification.

17. An apparatus comprising:
one or more non-transitory computer readable storage media;
program instructions stored on the one or more non-transitory computer readable storage media that, when executed by a processing system, direct the processing system to:
in response to a file open request in a first virtual machine for a file type without an assigned application, provide an end user of the first virtual machine with one or more applications available to support the file type, wherein the one or more applications reside in one or more attachable storage volumes;
receive a selection of an application of the one or more applications;
in response to the selection, initiate a first attachment process of the application to the first virtual machine;
transfer a record of the selection of the application to support the file type to an application attach service;
in the application attach service, update a profile for the user to include the application for the file type;
in the application attach service and after updating the profile, identifying a request for a second virtual machine for the end user;
in response to the request and in the application attach service, identify the application for the end user based on the profile; and
initiate a second attachment process of the application to the second virtual machine to make the application executable in the second virtual machine for the file type.

18. The apparatus of claim 17, wherein the program instructions to identify the request direct the processing system to receive a service login associated with the end user to initiate the second virtual machine.

19. The apparatus of claim 17, wherein the program instructions to identify the request direct the processing system to receive a request from the second virtual machine to attach one or more applications associated with the end user.

20. The apparatus of claim 17, wherein the second attachment process comprises attaching at least one storage volume of the one or more storage volumes that stores the application to the second virtual machine, and overlaying contents of the at least one storage volume in a file structure of the second virtual machine to make the application executable from the at least one storage volume.

* * * * *